United States Patent
Hu et al.

(10) Patent No.: US 11,624,624 B2
(45) Date of Patent: Apr. 11, 2023

(54) METHODS AND APPARATUSES FOR PREDICTING USER DESTINATIONS

(71) Applicant: Bayerische Motoren Werke Aktiengesellschaft, Munich (DE)

(72) Inventors: Wangsu Hu, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 16/940,414

(22) Filed: Jul. 28, 2020

(65) Prior Publication Data
US 2022/0034668 A1 Feb. 3, 2022

(51) Int. Cl.
*G01C 21/34* (2006.01)
*G06N 3/08* (2023.01)
*G06N 3/045* (2023.01)

(52) U.S. Cl.
CPC ......... *G01C 21/3461* (2013.01); *G06N 3/045* (2023.01); *G06N 3/08* (2013.01)

(58) Field of Classification Search
CPC ..... G01C 21/3461; G06N 3/0454; G06N 3/08
USPC ........................................................ 701/424
See application file for complete search history.

(56) References Cited

U.S. PATENT DOCUMENTS

| | | | | |
|---|---|---|---|---|
| 2013/0345957 A1* | 12/2013 | Yang | ........................ | G06N 5/02 706/56 |
| 2017/0350703 A1* | 12/2017 | McGavran | ......... | G01C 21/3617 |
| 2019/0302979 A1* | 10/2019 | Klein | ................... | G06F 3/04845 |
| 2021/0264315 A1* | 8/2021 | Yoshida | ................. | G16H 50/70 |

* cited by examiner

*Primary Examiner* — Mahmoud S Ismail
(74) *Attorney, Agent, or Firm* — 2SPL Patent Attorneys PartG mbB; Yong Beom Hwang (57) ABSTRACT

The present disclosure relates to a concept for machine-learning-based prediction of a destination for a user. Based on historic search data associated with the user, at least one candidate destination is determined based on the user and a given context. A plurality of embedding vectors are determined from an embedding matrix, wherein the embedding vectors are associated with the at least one candidate destination, the user, and the given context. The embedding matrix comprising embedding vectors for different components of the historic search data. The plurality of embedding vectors are fed into one or more first neural network layers to generate a semantic embedding for the candidate destination. The semantic embedding is into one or more second neural network layers to generate a probability score for the candidate destination.

14 Claims, 7 Drawing Sheets

METHODS AND APPARATUSES FOR PREDICTING USER DESTINATIONS

FIELD

The present disclosure generally relates to location finding and navigation and, more particularly, methods and apparatuses for predicting destinations for a user based on the user (user profile), a given context, and historic location data associated with the user.

BACKGROUND

Conventional navigational search algorithms are based on user's search recency, proximity and popularity. The search destination can be a recent searched location (recall), a given destination the user did not know before (find), or a recommended place the user might be interested in (discover).

Search engines of industrial prediction systems usually require input by keypad or by voice to start search among locations. After typing a prefix of the target location's name such as 'c' for a location staring with "c" or uttering the target location's name, the search engine will return a list of candidate locations ranked by the algorithm. If the target is not within the list, the user may either keep typing the remaining letters or rephrase the utterance. When the search process is in an initial stage without input by the user to the search engine, conventional services may provide a list of locations based on the user search history and favorite places such as home and office.

To optimize a ranking of the returned list of search results, a variety of models or algorithm are required to extract different aspects of user search behaviors. For example, temporal information can be represented by the recency of a searched location. Once a target location is returned and selected by the user, the location information can be sent to a downstream application, e.g., smart navigation and notification for route information.

As a user's location search behavior (historic location data) may be recorded as a sequential event of locations ordered by timestamps, contextual features can be revealed to model the behavior pattern then yielding a better ranking of the potential location candidates. Contextual modeling is popular in both academic and industrial area to enable human behavior learning of the sequential event input such as online purchase data, trip data, and check-in data. Contextual features may contain spatial information, e.g., current location, when a user doing the search and temporal information e.g., date and time of the search event, recency information of previous search events.

It is desired to provide a context-sensitive search concept to further improve a user's search experience.

SUMMARY

According to a first aspect of the present disclosure, it is provided a computer-implemented method for predicting a destination for a user. The method includes determining, based on information on the user and a given search context, at least one candidate destination from historic location data associated with the user. The method further includes determining, from an embedding matrix, a plurality of embedding vectors associated with the at least one candidate destination, the user, and the given context. Here, "determining" may be understood as training the plurality of embedding vectors and/or selecting pre-trained embedding vectors, depending on the state of the machine learning model. The embedding matrix comprises embedding vectors for different components of the historic location data (e.g., different historic users, different historic locations, different historic contexts, etc.). The method further includes feeding the plurality of embedding vectors into one or more context modeling machine learning network layers to generate a semantic embedding for the candidate destination. Here, the plurality of embedding vectors may be mapped to a single semantic embedding vector for the candidate destination. The method further includes feeding the semantic embedding into one or more ranking machine learning layers to generate a probability score for the candidate destination.

Thus, the user (e.g. a user profile, a user index, etc.), the given search context, and the user's search history may act as raw input data for the destination prediction. The user and the given search context may lead to a selection of one or more candidate destinations (potential destinations) from the historic location or search data. Each of the candidate destinations, together with the user and the given context, may then be translated to a respective plurality of embedding vectors. Here, each of the embedding vectors may be associated with (e.g., describe) a certain aspect of the candidate destination, the user, and the given context. That is, different components of the raw input (user, context, location) may be encoded to respective embedding vectors. The skilled person having benefit from the present disclosure will appreciate that an embedding is a relatively low-dimensional space into which one can translate high-dimensional vectors. An embedding is a mapping from discrete objects, such as users, locations, context (e.g. time, current location), words (e.g., search strings), to vectors of real numbers. The individual dimensions in these vectors typically have no inherent meaning. Instead, it is the overall patterns of location and distance between vectors that machine learning takes advantage of. Embeddings make it easier to do machine learning on large inputs like sparse vectors representing words (search queries) or locations. Ideally, an embedding captures some of the semantics of the input by placing semantically similar inputs close together in the embedding space. An embedding can be learned and reused across models. The plurality of embedding vectors is then fed to a machine learning context modeling network to construct a semantic embedding for the candidate destination by mapping the plurality of embedding vectors representing different raw inputs to a single semantic embedding vector representing the candidate destination. The respective semantic embeddings for a plurality of candidate destinations may then be fed into a machine learning ranking network to predict the target destination by determining the highest probability score among all candidate destinations.

In some embodiments, the historic search or location data associated with the user may be based on past data, among all possible destinations from difference sources, such as, for example, previously visited locations, a search history and a search from a digital map. Historic location data may be available for a plurality of different users. Historic location data may be stored in one or more local or remote electronic data storages to which the machine learning circuit has access.

In some embodiments, the context may indicative of at least one of a current time, a current location of the user, current weather conditions, current traffic conditions. The skilled person having benefit from the present disclosure will appreciate that the context of the user's search can include additional or alternative features and depend on the specific implementation. In some embodiments, the context component "current time" may be further decomposed into two features "hour of day" and "day of week". Similarly, the context component "current weather conditions" may be decomposed into "weather at origin"/"weather at destination". Similarly, the context component "current traffic conditions" may be decomposed into "traffic at origin"/"traffic at destination", for example.

In some embodiments, the at least one candidate destination may be determined from at least one of the user's personal search history, a query of the user (e.g., by typing or by voice recognition), or the given context (e.g., time, current user location). In other words, the at least one candidate destination may be determined from only the user's personal search history, only a query of the user, only the given context, or a combination thereof.

In some embodiments, the method may be performed for a plurality of candidate destinations to generate a respective probability score for each of the candidate destinations. This may be done in parallel or iteratively for the plurality of candidate destination.

In some embodiments, the method further includes predicting the user's target destination by choosing the candidate destination having the highest computed probability score or the highest rank among the plurality of candidate destinations. The candidate destination having the highest computed probability score may be listed first. Further candidate destinations may be listed in accordance with their respective probability scores. The candidate destination having the second highest computed probability score may be listed as second item, etc.

In some embodiments, the method further includes adjusting (training) computational weights of the context modeling and/or the ranking machine learning layers if the user (manually) selects a candidate destination as target destination not having the highest probability score or the highest rank to minimize a difference between the machine learning model prediction and ground truth corresponding to the user's selection. Here, the user's selection may act as ground truth for modifying the machine learning model so as to output a ranking list with the user's selection as top candidate destination. In this way, the machine learning model may be trained online (during operation).

In some embodiments, the method further includes training the embedding vectors of the embedding matrix based on the historic location data by adjusting computational weights of one or more feature processing layers of the machine learning model to map semantically similar components of the historic location data to geometrically close embedding vectors in a common semantic space. For example, this may be done together with training the context modeling and/or the ranking layers of the machine learning model.

The feature processing (embedding), context, and ranking machine learning model(s) can be trained together offline using the historic location data for training, validation and test. During online application, the user's search data may be continuously collected for model adaptation. In this phase, there may be several options, e.g. jointly train together. We can also adapt contextual ranking only on daily basis, and joint training on weekly or monthly basis, etc. In this case, training for embedding and contextual ranking can be flexibly managed, sometimes adapt ranking only and faster, and jointly adapt them a bit slower, etc.

In some embodiments, the embedding matrix comprises U user embedding vectors corresponding to U users in the location history, Q location embedding vectors corresponding to Q searched locations in the location history, K category embedding vectors corresponding to K destination categories in the location history, 24 hour embedding vectors corresponding to 24 hours per day, and seven day embedding vectors corresponding to seven days per week. The skilled person having benefit from the present disclosure will appreciate that other implementations are possible.

According to a further aspect of the present disclosure, it is provided an apparatus for predicting a destination for a user. The apparatus comprises circuitry configured to determine, based on the user and a given context, at least one candidate destination from historic location data associated with the user. The circuitry is further configured to determine, from an embedding matrix, a plurality of embedding vectors associated with the at least one candidate destination, the user, and the given context. The embedding matrix comprises embedding vectors for different components of the historic location data. The circuitry comprises one or more first (context modeling) machine learning network layers configured to generate a semantic embedding for the candidate destination based on the determined plurality of embedding vectors. The circuitry further comprises one or more second (ranking) machine learning network layers configured to generate a probability score for the candidate destination based on the semantic embedding for the candidate destination.

In some embodiments, the one or more first (context modeling) machine learning network layers may be implemented as a convolutional neural network (CNN). The one or more second (ranking) machine learning layers may be implemented as a CNN or a fully connected neural network, for example.

In some embodiments, the (machine learning) circuitry is configured to generate a respective probability score for a plurality of candidate destinations and to predict the user's target destination by choosing the candidate destination having the highest probability score.

In some embodiments, the (machine learning) circuitry is configured to adjust (train) computational weights of the first and/or the second machine learning network layers if the user selects a candidate destination as target destination not having the highest probability score.

This sort of training could be performed during user operation of the apparatus, for example.

In some embodiments, the (machine learning) circuitry is configured to train the embedding matrix based on the historic location data (search history) by adjusting computational weights of one or more third machine learning network layers to map semantically similar components of the search history to geometrically close embedding vectors. The training data would be different users and respective contexts together with related target destinations. The feature processing layer, the context modeling layer, and the ranking layer may be trained together in order to minimize a difference between the model prediction and ground truth corresponding to the user's target destination from the search history.

According to a further aspect of the present disclosure, it is provided a vehicle. The vehicle comprises (machine learning) circuitry configured to determine, based on the user and a given context, at least one candidate destination from historic location data associated with the user. The circuitry is further configured to determine, from an embedding matrix, a plurality of embedding vectors associated with the at least one candidate destination, the user, and the given context. The embedding matrix comprises embedding vectors for different (categorial) components of the historic location data. The circuitry comprises one or more first (context modeling) machine learning network layers configured to generate a semantic embedding for the candidate destination based on the determined plurality of embedding vectors. The circuitry further comprises one or more second (ranking) machine learning layers configured to generate a probability score for the candidate destination based on the semantic embedding for the candidate destination. The circuitry is configured to generate a respective probability score for a plurality of candidate destinations and to predict the user's target destination by choosing the candidate destination having the highest probability score.

The present disclosure proposes a contextual, personalized and collaborative algorithmic framework for the smart search based on user search behavior learning.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

An objective of the present disclosure may be, for a given user (u), context (c), and optional query (q), find the best ranked destinations (d) the user may look for. For example, a user (u) types, e.g. "c" (=q), for a given location (l) and time (t), yielding input data (u, l, t, q).

Figure 1:
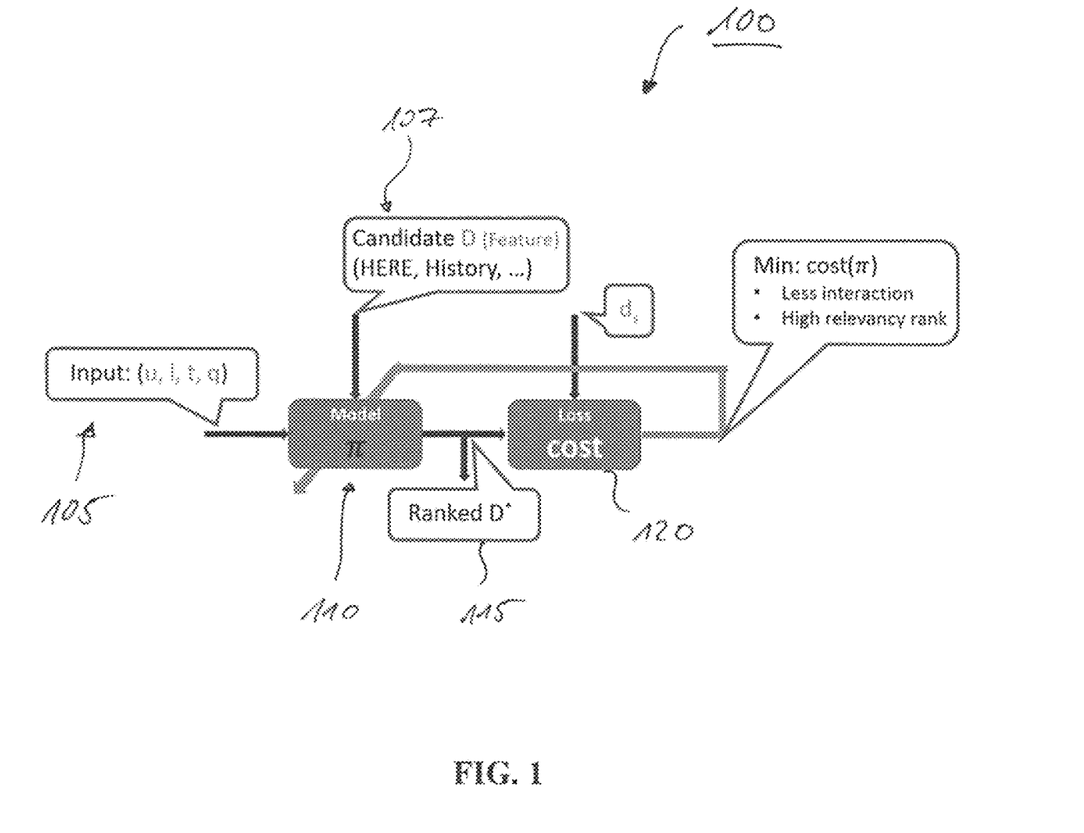
FIG. 1 shows a block diagram of an apparatus for predicting a destination for the user in accordance with the present disclosure.

FIG. 1 shows a block diagram of an apparatus 100 for predicting a destination for the user in accordance with the present disclosure, given the input data (u, l, t, q).

Apparatus 100 comprises machine learning circuitry 110 implementing one or more machine-learning algorithms configured to model a user's search preference based on information on the user (u), a given search context (l, t, q), and based on historic location (search) data associated with the user and/or other users.

At an input stage, machine learning circuitry 110 is configured to determine, based on the information 105 on the user and the given search context, at least one candidate destination from historic location data 107 associated with the user. At the input stage, the information 105 on the user, the given search context, and the candidate destination may be used as pointers to entries of an embedding matrix comprising a plurality of embedding vectors. Each of the inputs 105, 107 may thus be mapped to a corresponding embedding vector of real numbers. Thus, machine learning circuitry 110 is further configured to determine, from the embedding matrix, a plurality of embedding vectors associated with the at least one candidate destination, the user, and the given search context. The embedding matrix comprises embedding vectors for different components or aspects of the input data 105 and the candidate destination determined from historic location data 107. The skilled person having benefit from the present disclosure will appreciate that the embedding vectors of the embedding matrix may have to be trained during a training phase. The mapping from raw input 105 to corresponding embedding vectors will also be referred to as feature processing layer of machine learning circuitry 110 in the sequel.

The plurality of embedding vectors representing the raw input 105 and the at least one candidate destination from historic location data 107 can be regarded as output of the feature processing layer and may serve as input for a subsequent context modeling layer of machine learning circuitry 110. The context modeling layer of machine learning circuitry 110 is configured to generate a semantic embedding for the candidate destination based on the plurality of embedding vectors determined by the feature processing layer. For example, the context modeling layer of machine learning circuitry 110 may be implemented as a convolutional neural network (CNN). However, other network topologies may apply as well, depending on the underlying problem to solve. Output of the context modeling layer of machine learning circuitry 110 is a semantic embedding vector for each candidate destination.

The semantic embedding vectors for the candidate destinations may then serve as input for a ranking layer of machine learning circuitry 110 which is configured to generate a probability score for each candidate destination based on the semantic embedding (vector) for the respective candidate destinations. For example, the ranking layer of machine learning circuitry 110 may be implemented as a CNN or as a fully connected neural network. However, the skilled person having benefit from the present disclosure will appreciate that other network topologies may apply as well, depending on the underlying specific problem to solve.

Output of the ranking layer of machine learning circuitry 110 may be a ranking 115 of a plurality of candidate destinations the based on the input information 105 on the user and the given search context as well as the historic location data 107. The candidate destination having the highest probability according to machine learning circuitry 110 modelling the user's search preference may be ranked first. The candidate destination having the second highest probability may be ranked second, and so on.

In case the predicted candidate location having the highest probability actually matches the user's true search preference or true search intention (ground truth) $d_s$, machine learning circuitry 110 models the user's search preference well. However, if the user selects another destination as true search intention (ground truth) $d_s$ than the predicted candidate location having the highest probability score, the machine learning model needs to be adapted until a loss cost function 120 between ranking 115 and ground truth $d_s$ is minimum. Thus, training of machine learning circuitry 110 can also happen during operation of apparatus 100. The skilled person having benefit from the present disclosure will appreciate that machine learning circuitry 110 may initially be trained based on search histories (training data) for different users, respective search contexts, and respective intended destinations.

Figure 2:
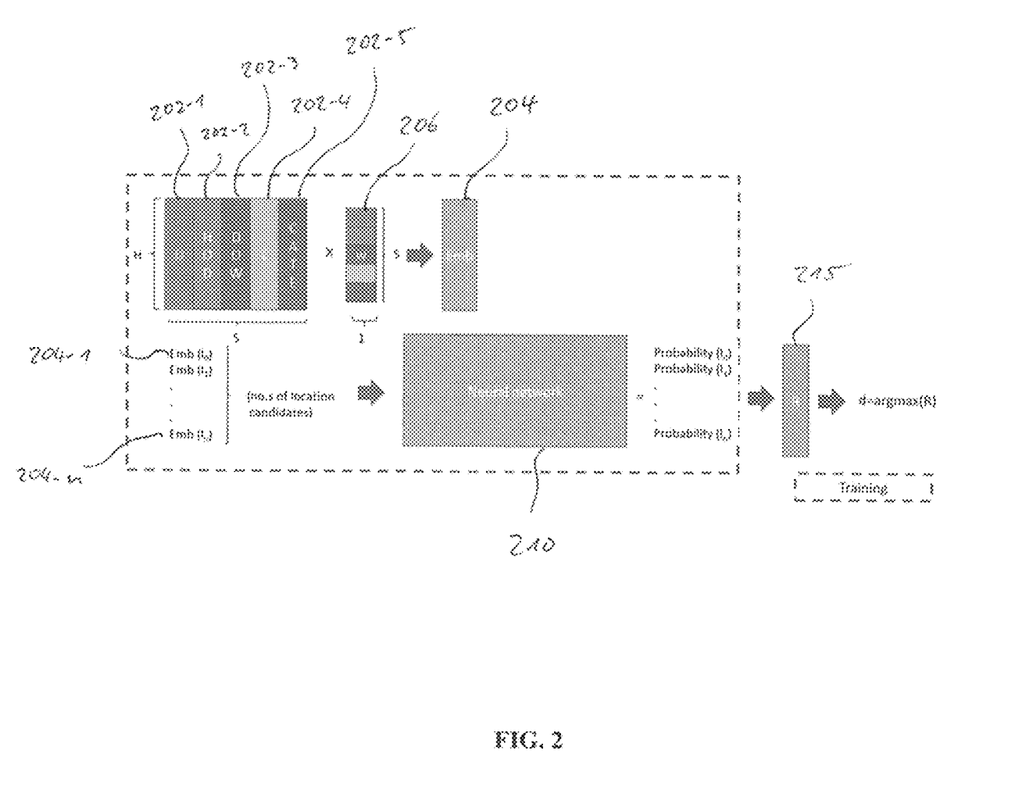
FIG. 2 shows a high-level overview of the proposed algorithm framework.

FIG. 2 provides a high-level overview of the proposed algorithm framework.

The input information 105 on the user and the given search context as well as the candidate destination from historic location data 107 is translated into corresponding embedding vectors 202-1, . . . , 202-N (here: N=5). For example, the user may be mapped to embedding vector 202-1. In the illustrated example search context "search time" is subdivided into "hour of day (HOD)" and "day of week (DOW)". HOD may be mapped to embedding vector 202-2, DOW may be mapped to embedding vector 202-3. Search context "current location of user (L)" may be mapped to embedding vector 202-4. A category of the candidate destination (CATE) may be mapped to embedding vector 202-5. The skilled person having benefit from the present disclosure will appreciate that the mapping of raw input to feature/embedding vectors illustrated in FIG. 2 is of mere illustrative nature and that other contexts and/or mappings are conceivable.

The embedding vectors 202-1, . . . , 202-N output from feature processing layer of machine learning circuitry 110 are input to context modeling layer which translates the embedding vectors 202-1, . . . , 202-N representing the inputs to a semantic embedding vector 204 for the respective candidate destination. For this purpose, the plurality of embedding vectors 202-1, . . . , 202-N may be weighted with respective computational weights 206 of context modeling layer which have to be trained.

Semantic embedding vectors 204-1, . . . , 204-n for respective n candidate destinations are fed into a ranking neural network 210 making up to deliver a ranking 215 of the plurality of candidate destinations $l_0, l_1, \ldots, l_n$. The proposed system is trainable based on the loss defined by ranking task, e.g. rank locations.

In the following, a more detailed description of the various layers of machine learning circuitry 110 will be provided.

Feature Processing Layer

For example, a user search event may be defined as searching a certain location at a given temporal context. Here, temporal context C may be further decomposed into two features: hour of day HOD and day of week DOW. All users U, potential locations (destinations) L, destination category Cate, and temporal context C may be modeled to construct the feature processing layer comprising the raw input. To encode spatial and temporal context information, representation learning may be applied to generate respective embedding vectors for different objects or components in the search history 107. An embedding is a mapping of a discrete categorical variable to a vector of continuous numbers. Therefore, a semantic meaning can be enriched for objects such as locations, hour of day, and day of week. Normally, an embedding may be trained in a data-driven framework to preserve the semantic meaning of objects. For example, features of user set U, user location set L, destination category set CATE, hour of day set HOD, and day of week set DOW in the search history 107 may be embedded as follows:

$$E(\{U\}) = [[U_{1,1}, U_{1,2}, \ldots, L_{1,S}], \ldots, [U_{Q,1}, U_{Q,2}, \ldots, U_{Q,S}]]$$

$$E(\{L\}) = [[L_{1,1}, L_{1,2}, \ldots, L_{1,S}], \ldots, [L_{Q,1}, L_{Q,2}, \ldots, L_{Q,S}]]$$

$$E(\{CATE\}) = [[CATE_{1,1}, CATE_{1,2}, \ldots, CATE_{1,S}], \ldots, [CATE_{K,1}, CATE_{K,2}, \ldots, CATE_{K,S}]]$$

$$E(\{HOD\}) = [[HOD_{1,1}, HOD_{1,2}, \ldots, H_{1,S}], \ldots, [HOD_{24,1}, HOD_{24,2}, \ldots, HOD_{24,S}]]$$

$$E(\{DOW\}) = [[DOW_{1,1}, DOW_{1,2}, \ldots, DOW_{1,S}], \ldots, [DOW_{7,1}, DOW_{7,2}, \ldots, DOW_{7,S}]]$$

where S denotes a pre-defined feature size of the embedding vectors, Q denotes the size of potential locations (destinations) in the search history 107, and K denotes the size of location categories in the search history 107, respectively. Therefore, any search event (u, l, k, h, d) that user u searched l-th location that is under k-th category at h-th hour of day and d-th day of week can be encoded as $$E(u,l,k,h,d) = (\text{lookup}_u E(\{U\}), \text{loookup}_l E(\{L\}), \text{lookup}_k E(\{CATE\}), \text{lookup}_h E(\{HOD\}), \text{lookup}_d E(\{DOW\}))$$

where $\text{lookup}_i(E)$ is an operation that extract i-th row (embedding vector) from the embedding matrix E. The raw input 105 determines which row (embedding vector) is extracted. Thus, the user (u), the given search context (k, h, d), and the candidate destination (l) may be used as pointers to entries of the embedding matrix. The extracted vector may be of (S, 1)-size. In the illustrated example, E(u, l, k, h, d) results in a (S×5) matrix since we have 5 embedding vectors 202-1, . . . , 202-5 of respective feature size S. Of course, different numbers of embedding vectors and respective feature sizes are possible to encode search events.

Context Modeling Layer

Figure 3:
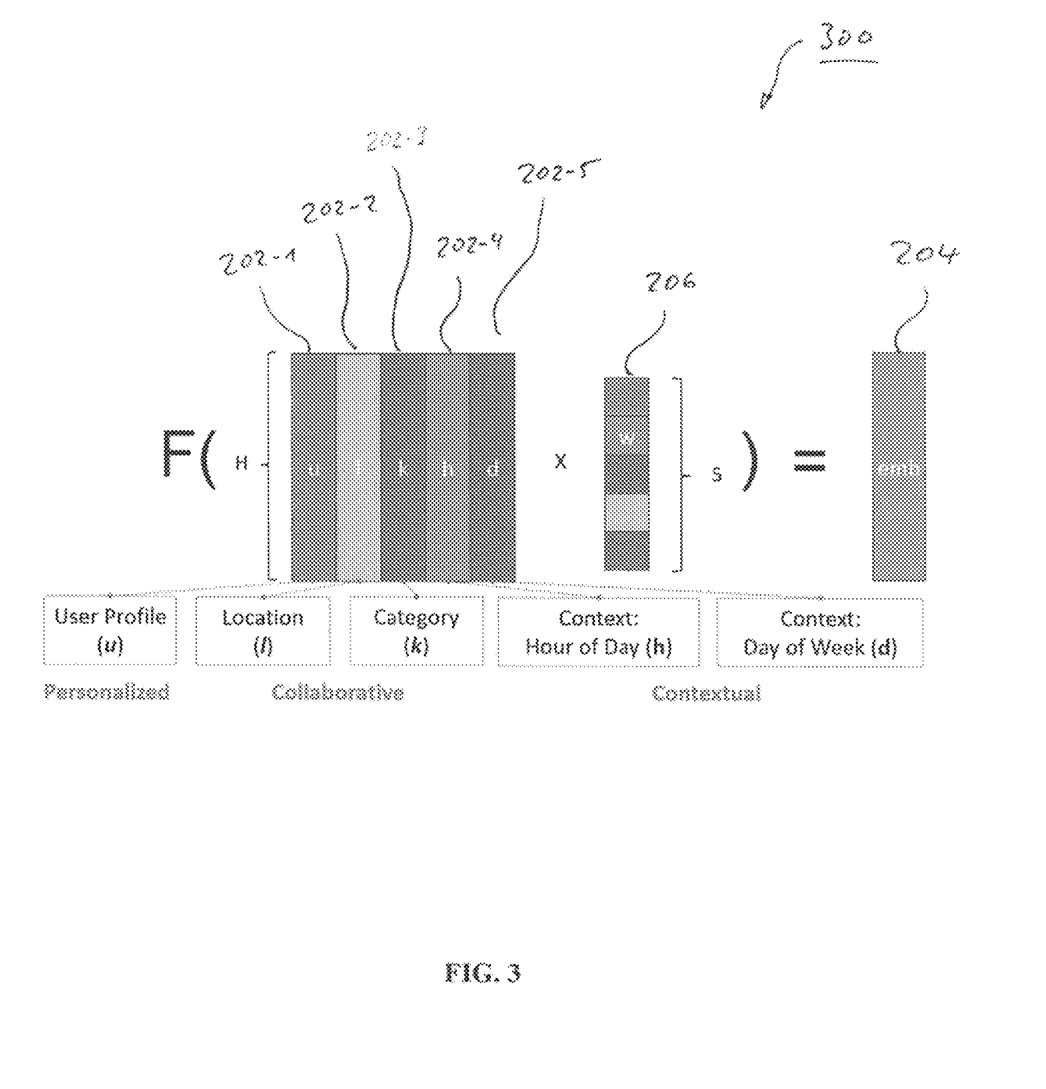
FIG. 3 illustrates an example of a context modeling layer.

An example of context modeling layer 300 of machine learning circuitry 110 is illustrated in FIG. 3. In context modeling layer 300, a goal is, given feature-processed contextual information E(u, l, k, h, d) of search event r, i.e., corresponding embedding vectors 202-1, . . . , 202-5, to construct its semantic embedding. Context modeling layer 300 may be a supervised learning algorithm which computes semantic representation for (historic) search events by respecting their similarity to a given query/context.

A detailed example calculation of a semantic embedding 204 for search event r may be as follows:

$$emb = (concatenate_{axis=1}(E(U_u), E(L_l), E(CATE_k), E(DOW_d), E(HOD_h)) \times w + b)$$

where concatenate$_{axis=1}$( ) denoted an operation that concatenates the five (S, 1)-size embedding vectors from the feature processing layer along the second axis to generate a (S×5) matrix, and w and b are linear transformation parameters that need to be trained. Although FIG. 3 illustrates a single layer learning machine, search event inputs could be also mapped into a lowdimensional semantic space with a deep neural network (e.g. CNN) to achieve a highly nonlinear semantic embedding to model the human perception of location search semantics. The calculation of the semantic embedding 204 may be done for all candidate destinations, given their respective feature-processed contextual information E(u, l, k, h, a) from the feature processing layer. The output of context modeling layer 300 may this be one or more semantic embeddings 204 for one or more candidate destinations.

Ranking Layer

Figure 4:
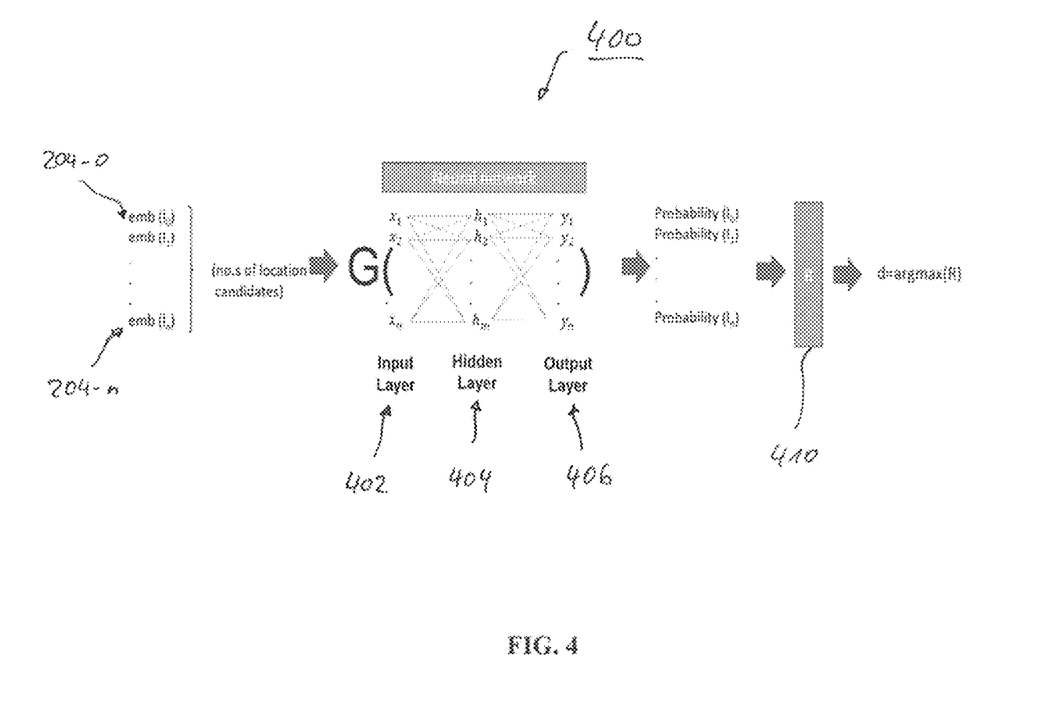
FIG. 4 illustrates an example of a ranking layer.

An embodiment of the one or more ranking layers 400 is illustrated in FIG. 4.

In the ranking layer(s) 400, learning to rank or machine-learned ranking (MLR) may be leveraged to rank the candidate destinations to predict the most possible search destination. MLR is the application of machine learning, typically supervised, semi-supervised or reinforcement learning, in the construction of ranking models for information retrieval systems. Training data may comprise lists of items with some partial order specified between items in each list. This order is typically induced by giving a numerical or ordinal score or a binary judgment (e.g. "relevant" or "not relevant") for each item. The ranking model purposes to rank, i.e. producing a permutation of items in new, unseen lists in a similar way to rankings in the training data. Here, listwise MLR may be applied to rank the list of candidate destinations.

For the convenience of MLR algorithms, search event—candidate destination pairs may be represented by numerical vectors, the semantic embedding vectors 204. Components of semantic embedding vectors 204 may be referred to as features, factors, or ranking signals. They may be divided into three groups:

Query-independent or static features those features, which depend only on the candidate destination, but not on the search/query.

Query-dependent or dynamic features those features, which depend both on the candidate destination and the query.

Query level features or query features, which depend only on the query. For example, the number of letters or words in a query.

As can be seen from FIG. 4, a plurality of semantic embedding vectors 204-0, . . . , 204-n (corresponding to the candidate destinations) from context modeling layer 300 act as input to the ranking layer(s) 400 which may be implemented as CNN or fully connected neural network comprising an input layer 402, one or more hidden layers 404, and an output layer 406. The output layer 406 may provide a probability/likelihood $y_1$, . . . , $y_n$ for each candidate destination. Block 410 may then apply a softmax function to $y_1$, . . . , $y_n$. Softmax is a function that takes as input a vector of n real numbers and normalizes it into a probability distribution comprising n probabilities proportional to the exponentials of the input numbers. The predicted destination (ranked first) may then correspond to the candidate destination with the highest probability.

The detailed calculation of search location prediction may be as follows $$X = \{x_i\} = \{emb_i\}; H = \{h_i\} = relu(X \times w_H + b_H); Y = \{y_i\} = relu(H \times w_Y + b_Y)$$

$$R = \{y_i\} = softmax(Y)$$

$$d = argmax(R)$$

where relu denotes an activation function defined as the positive part of its argument relu x=max(0, x+), softmax( ) is an activation function defined as the normalized distribution of input value, and w, b are the parameters that need to be trained based on historic search data as ground truth. Therefore, the target location d may be predicted by choosing the highest score among all candidates R. If the prediction does not correspond to the user's truly desired destination (ground truth), model parameters of the feature processing layer, context modeling layer and/or the ranking layer may be updated so as to minimize the difference between prediction and ground truth.

Figure 5:
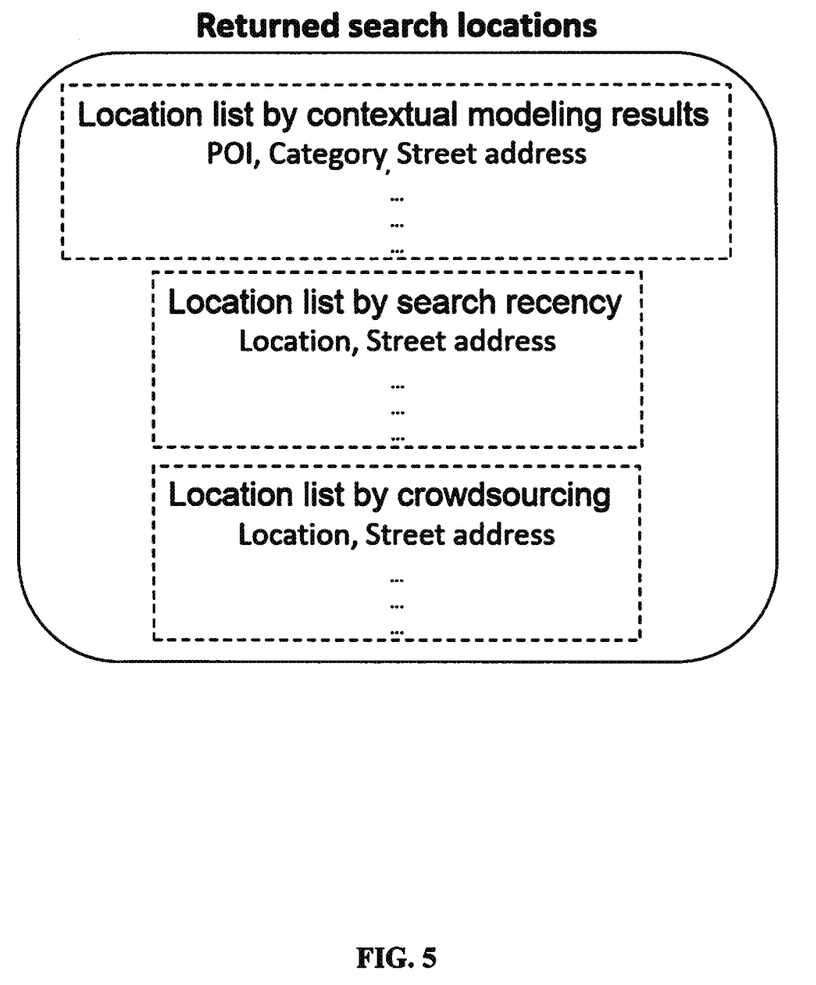
FIG. 5 shows an example of returned search results.

The proposed concept aims to integrate user profile and context information to provide destination predictions in different levels of granularity (for example, low—Category; medium—POI; high—street address). A joint search result from the proposed model, the search history 107, and third-party crowdsourcing like map service may enhance the user experience in all three initially mentioned search scenarios (recall/find/discover). An example of returned search locations is illustrated in FIG. 5, wherein the location list by contextual modeling results may be returned by the proposed concept.

The deployment of the proposed model on location search task was explored under three different scenarios: no user input, user types 1 character, and user types 2 characters.

Dataset: User search events.

Raw feature: (user ID, search location name, timestamp), 220 users, 8,995 locations including POI name and street address, 8 months period.

Task:

Assume we have user search events $$I_{t_T} = \{(\text{search location} i_0 \text{ at time} t_0), \ldots, (\text{search location} i_T \text{ at time} t_T)\}, t \in w,$$

it aims to predict $I_{t_{T+1}}$ 90% of total events as were used as training dataset, where data contains both location i and timestamp t information for the search, and used the remaining 10% as the test dataset. The top 1-best and 5-best matching accuracy that is widely used in recommendation system to measure the performance were applied.

Modeling:

User (u);

Temporal: hour-of-day (hod: h), day-of-week (dow: d);

Spatial: destination ($d_u \in D_u$, $D_u \in D$, $D_u \cap D_{u'} = \Pi$) where $D_u$ indicates the location candidates are from user u search history, D represent all locations collected from all users U. POI category (cate: k)

Evaluation Metrics:

1-best: exact match (EM);

5-best;

Baseline: among personal POI $P(d|D_u)$: destination search based on popularity among personal location candidate; (11.2%, 32.4%)

P(d|D$_u$): destination search based on search recency among personal location candidate; (6.0%, 8.1%)
Proposed algorithm:
P(d|u, k, h, d, D$_u$): contextual and personal search, among personal location candidates (45.8%, 74.7%)
P(d|u, k, h, d, D): contextual and personal search, among locations from all the users; (9%, 21%)
Remark:
1. Smart search significantly outperforms popularity search: 1-best (45.8% vs 11.2%) and 5-best (74.7% vs 32.4%)
2. Smart search significantly outperforms recency search: 1-best (45.8% vs 6.0%) and 5-best (74.7% vs 8.1%)
Performance: User Types 1 or 2 Characters
Evaluation Metrics:
EM (1-best);
5-best;
Baseline P(d D): popular destination search among all locations from all the users (1567 per user in average); (9%, 21%) User types 1 character, among all POI but filtered by query (78 per user in average)
P(d|u, k, h, d, q, D): contextual and personal search; (32%, 55%)
User types 2 character, among all POI but filtered by query (10 per user in average)
P(d|u, k, h, d, q, D): contextual and personal search; (61%, 87%)

The skilled person having benefit from the present disclosure will appreciate that the proposed search concept may be well suited for enhancing navigational systems in smartphones and/or cars. Therefore, according to a further aspect of the present disclosure, it is also provided a vehicle.

Figure 6:
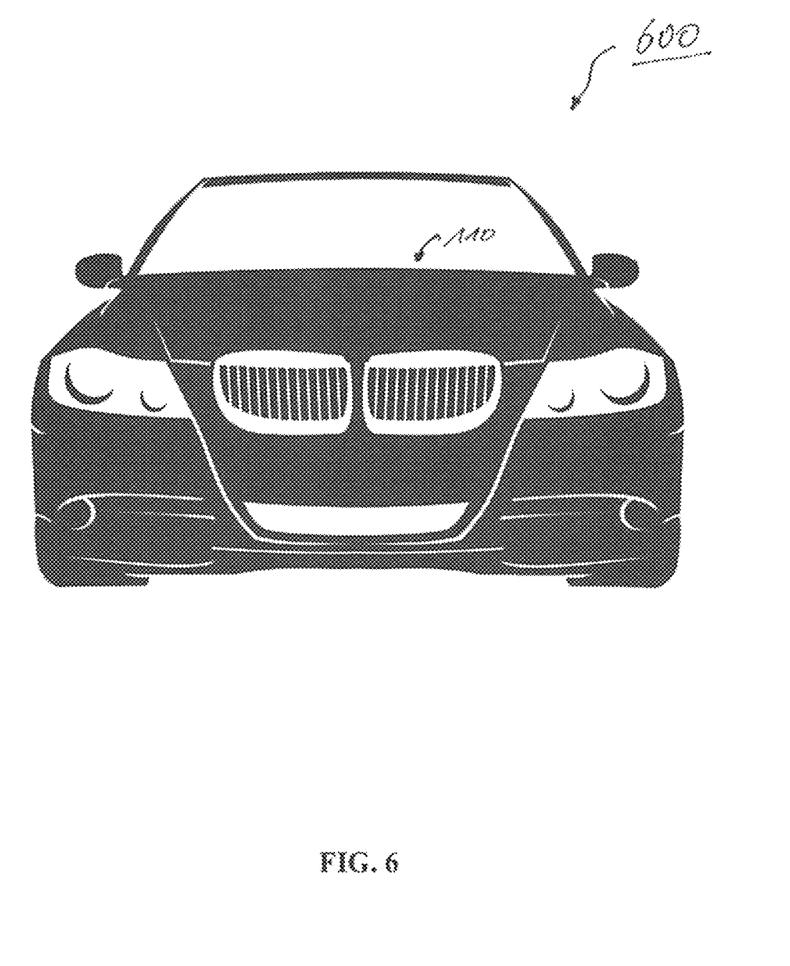
FIG. 6 illustrates a car comprising an apparatus for predicting a destination for the user in accordance with the present disclosure.

The vehicle 600 shown in FIG. 6 comprises machine learning circuitry 110 configured to determine, based on a user and a given search context, at least one candidate destination from historic location data associated with the user. The machine learning circuitry 110 is further configured to determine, from an embedding matrix, a plurality of embedding vectors 202 associated with the at least one candidate destination (l), the user (u), and the given context (t, q). The embedding matrix comprises embedding vectors 202 for different (categorial) components of the input (u, l, t, q). The learning circuitry 110 comprises one or more context modeling machine learning network layers 300 configured to generate a semantic embedding 204 for the candidate destination based on the determined plurality of embedding vectors 202. The learning circuitry 110 further comprises one or more ranking machine learning layers 400 configured to generate a probability score for the candidate destination based on the semantic embedding 204 for the candidate destination. The circuitry is configured to generate a respective probability score for a plurality of candidate destinations and to predict the user's target destination by choosing the candidate destination having the highest probability score.

Figure 7:
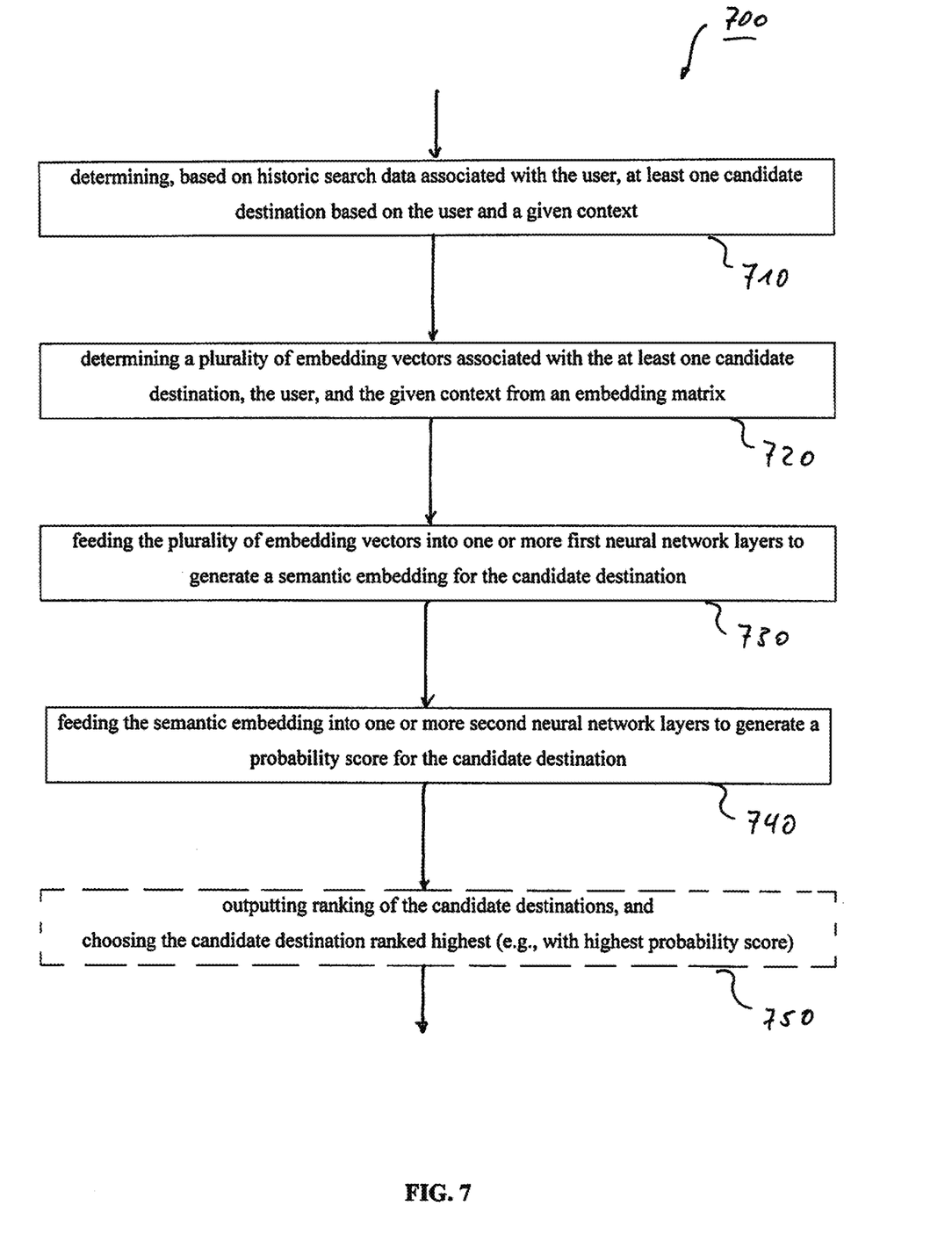
FIG. 7 shows a flowchart of a method for predicting a destination for the user in accordance with the present disclosure.

To summarize, FIG. 7 illustrates a flowchart of a method 700 for predicting a destination for a user.

Method 700 includes determining 710, based on historic search data 107 associated with the user (u), at least one candidate destination (l) based on the user and a given context (t, q). Method 700 further includes determining 720 a plurality of embedding vectors 202 associated with the at least one candidate destination, the user, and the given context from an embedding matrix. The embedding matrix comprises embedding vectors for different components of the historic search data. The skilled person having benefit form the present disclosure will appreciate that determining 720 may include training the embedding vectors 202 and then selecting trained embedding vectors 202. Method 700 further includes feeding 730 the plurality of embedding vectors into one or more first neural network layers to generate a semantic embedding 204 for the candidate destination. Method 700 further includes feeding 740 the semantic embedding 204 into one or more second neural network layers to generate a probability score for the candidate destination.

As indicated at 750, the method 700 may be performed for a plurality of candidate destinations to generate a respective probability score for each of the candidate destinations, resulting in a ranking of the candidate destinations. The user's target destination may be predicted by choosing the candidate destination having the highest probability score or the highest rank among the plurality of ranked candidate destinations.

Embodiments of the present disclosure may provide contextual, personalized and collaborative learning framework to improve search experience: The proposed concept leverages context information to model search event. Not only the final prediction retains a good performance but also the intermediate output such as object embedding 202 and user embedding 204 can be critical features for other downstream tasks, e.g., segmentation.

Collaborative filtering among objects: As embedding location to process the discrete value of its name, locations that a user might search on the basis of reactions by similar users may be filtered out to enhance the personalization in the search scenario "discover" or recommendation.

Rich semantic modeling: By using embeddings, the capabilities of previous Natural Language Processing (NLP) methods may be expanded by creating contextual representations based on the surrounding context which may lead to richer semantic models.

Good performance: The proposed algorithm may significantly outperform prior-art models.

Smart search experience: Physical context plays more critical role for search location for navigation than online searches as the user has to physically drive toward the destination.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a preprocessing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. Method for predicting a destination for a user, the method comprising:
   determining, using machine-learning circuitry, based on historic search data associated with the user, at least one candidate destination based on the user and a given context, wherein the machine learning circuitry implements one or more machine-learning algorithms configured to model a user's search preference based on information on the user, the given context, and based on the historic search data associated with the user and/or other users;
   determining, using the machine-learning circuitry, a plurality of embedding vectors associated with the at least one candidate destination, the user, and the given context from an embedding matrix, the embedding matrix comprising embedding vectors for different components of the historic search data, wherein each candidate destination with the user and the given context is mapped to a respective plurality of embedding vectors, wherein each embedding vector is associated with a certain aspect of the candidate destination, the user, and the given context;
   feeding the plurality of embedding vectors into one or more first neural network layers of the machine-learning circuitry to generate a semantic embedding for the candidate destination, wherein a plurality of embedding vectors associated with each candidate destination are mapped to a single semantic embedding for each candidate destination;
   feeding the semantic embedding into one or more second neural network layers of the machine-learning circuitry to generate a probability score for each candidate destination; and
   outputting ranking of the at least one candidate destination based on the probability score for each candidate destination.

2. The method of claim 1, wherein the context is indicative of at least one of a current time, a current location of the user, current weather conditions, current traffic conditions.

3. The method of claim 2, wherein the context "current time" is decomposed into two features "hour of day" and "day of week".

4. The method of claim 1, wherein the at least one candidate destination is determined from at least one of the user's personal search history, a query of the user, or the given context.

5. The method of claim 1, wherein the method is performed for a plurality of candidate destinations to generate a respective probability score for each of the candidate destinations.

6. The method of claim 5, comprising
   predicting the user's target destination by choosing the candidate destination having the highest probability score or the highest rank among the plurality of candidate destinations.

7. The method of claim 6, further comprising
   adjusting computational weights of the first and/or the second neural network layers if the user selects a candidate destination as target destination not having the highest probability score or the highest rank to minimize a difference between the model prediction and ground truth corresponding to the user's selection.

8. The method of claim 1, further comprising
training the embedding matrix based on the search history by adjusting computational weights of one or more embedding layers to map semantically similar components of the historic location data to geometrically close embedding vectors in a common semantic space.

9. The method of claim 1, wherein the embedding matrix comprises U user embedding vectors corresponding to U users, Q location embedding vectors corresponding to Q searched locations, K category embedding vectors corresponding to K destination categories, 24 hour embedding vectors corresponding to 24 hours per day, and seven day embedding vectors corresponding to seven days per week.

10. Apparatus for predicting a destination for a user, the apparatus comprising machine-learning circuitry configured to implement one or more machine-learning algorithms configured to model a user's search preference based on information on the user, the given context, and based on the historic search data associated with the user and/or other users, the machine-learning circuitry configured to:
determine, based on historic search data associated with the user, at least one candidate destination based on the user and a given context;
determine a plurality of embedding vectors associated with the at least one candidate destination, the user, and the given context from an embedding matrix, the embedding matrix comprising embedding vectors for different components of the historic search data, wherein each candidate destination with the user and the given context is mapped to a respective plurality of embedding vectors, wherein each embedding vector is associated with a certain aspect of the candidate destination, the user, and the given context;
feed the plurality of embedding vectors into one or more first neural network layers configured to generate a semantic embedding for the candidate destination, wherein a plurality of embedding vectors associated with each candidate destination are mapped to a single semantic embedding for each candidate destination;
feed the semantic embedding into one or more second neural network layers configured to generate a probability score for each candidate destination; and
output ranking of the at least one candidate destination based on the probability score for each candidate destination.

11. The apparatus of claim 10, wherein the circuitry is configured to generate a respective probability score for a plurality of candidate destinations and to predict the destination by choosing the candidate destination having the highest probability score.

12. The apparatus of claim 11, wherein the circuitry is configured to adjust computational weights of the first and/or the second neural network layers if the user selects a candidate destination as target destination not having the highest probability score.

13. The apparatus of claim 10, wherein the circuitry is configured to train the embedding matrix based on the historic search data by adjusting computational weights of one or more third neural network layers to map semantically similar components of the historic search data to geometrically close embedding vectors.

14. A vehicle, comprising
machine-learning circuitry configured to implement one or more machine-learning algorithms configured to model a user's search preference based on information on the user, the given context, and based on the historic search data associated with the user and/or other users, the machine-learning circuitry configured to
determine, based on historic search data associated with the user, at least one candidate destination based on the user and a given context;
determine a plurality of embedding vectors associated with the at least one candidate destination, the user, and the given context from an embedding matrix, the embedding matrix comprising embedding vectors for different components of the historic search data, wherein each candidate destination with the user and the given context is mapped to a respective plurality of embedding vectors, wherein each embedding vector is associated with a certain aspect of the candidate destination, the user, and the given context;
feed the plurality of embedding vectors into one or more first neural network layers configured to generate a semantic embedding for the candidate destination, wherein a plurality of embedding vectors associated with each candidate destination are mapped to a single semantic embedding for each candidate destination;
feed the semantic embedding into one or more second neural network layers configured to generate a probability score for each candidate destination; and
output ranking of the at least one candidate destination based on the probability score for each candidate destination,
wherein the machine-learning circuitry is configured to
generate a respective probability score for a plurality of candidate destinations and to predict a user's target destination by choosing the candidate destination having the highest probability score.

* * * * *